US006979964B1

(12) United States Patent
Roe

(10) Patent No.: US 6,979,964 B1
(45) Date of Patent: Dec. 27, 2005

(54) APPARATUS FOR APPLYING DC POWER TO AN INDUCTIVE LOAD

(75) Inventor: Bruce C. Roe, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/951,420

(22) Filed: Sep. 28, 2004

(51) Int. Cl.[7] .................................................. H02P 1/00
(52) U.S. Cl. ....................... 318/139; 318/727; 388/806
(58) Field of Search ................................ 318/139, 727, 318/138, 439, 256; 388/806, 807; 363/123

(56) References Cited

U.S. PATENT DOCUMENTS 6,396,137 B1 * 5/2002 Klughart ..................... 257/691
2003/0071596 A1 * 4/2003 Gokhale et al. ............ 318/727

* cited by examiner

*Primary Examiner*—Karen Masih

(57) ABSTRACT

Apparatus including a DC-DC converter that applies a variable voltage to an inductive load, such as a fan motor. The converter has a low-frequency high dynamic output impedance and applies a variable voltage from its output to the inductive load. A transient limiter, such as a capacitor, is connected in parallel with the inductive load to minimize the amplitude of transients generated by the load during the reception of the variable voltage from the converter. The converter has a low frequency of operation to inhibit the generated transients from being extended to a DC power source connected to the input of the converter. This prevents the transients from being applied to other circuits served by the DC power source. The fan may be used to provide cooling for the apparatus of which the DC-DC converter is a part.

20 Claims, 6 Drawing Sheets

APPARATUS FOR APPLYING DC POWER TO AN INDUCTIVE LOAD

FIELD OF THE INVENTION

This invention relates to a power supply, and in particular, to a power supply suitable for powering an inductive load, such as a fan that provides cooling for electronic circuitry.

PROBLEM

It is known to use electric fans to provide cooling for electronic equipment. In many installations, the electronic equipment is relatively large and bulky and the fan is mounted externally to the electronic equipment. In such installations, the size and power requirement of the fans and the manner in which they were powered was relatively unimportant as long as they provided the necessary cooling. Often, the fans and the electrical equipment had separate power supplies.

More recently, with the advent of electric miniaturization, fans and the associated electronic equipment are functionally integrated with the fans and the electronic equipment being powered from the same power source. With this integration, high frequency, tightly regulated switching power supplies coupled to a common DC power source are used to power both the fan motors and the electronic equipment.

In order to be compatible with the associated electronic equipment, the fan motors are generally of a DC electronic commutation (brushless) design. The rotation of the fan motors generates ripple currents having fast transitions whose magnitude exceeds the average current.

The fan motors and the electronic equipment in prior art systems are typically served by separate high-frequency precise regulation DC-DC converters connected to a common DC power source. Since the two separate DC-DC converters are powered by a common DC power source, there is possible adverse interaction between the two DC-DC converters. This is caused by the varying load currents of the fan which generate ripple currents that are applied to the output of a first DC-DC converter serving the fan and extended back through the first DC-DC converter to the common power supply that also serves a second DC-DC converter serving the electronic equipment. These undesirable ripple currents adversely affect the operation of the second DC-DC converter as well as the logic circuitry served by the second DC-DC converter.

It is desirable that this interaction be minimized so as to not impair the operation of the logic circuitry. The cause of the problem is that these DC-DC converters were designed to power logic circuitry. They were typically of the high frequency, highly regulated type that provided a constant output voltage to the logic circuitry.

As the need arose to provide cooling for the logic circuitry and the functionally integrated fans, the natural evolution was to use the same type of DC-DC converters that served the electronic equipment to provide power for the small fan motors. The use of the small, efficient, constant voltage DC-DC converters to power both the electronic equipment and the fan motors presented incompatibility problems. The electronic equipment draws a constant input voltage. Fan motors can tolerate varying output voltages and they draw varying currents. This incompatibility causes undesirable transients generated by the inductive windings of the fan motors to be extended back through their associated DC-DC converters to the DC-DC converters serving the logic circuitry. These transients adversely affect the operation of the DC-DC converters serving the logic circuitry as well as the logic circuits.

The small high frequency constant voltage DC-DC converters of prior art systems have difficulty in tracking the ripple currents generated by the fan motor. Maintaining a typical output voltage accuracy of less than 1% is difficult for a DC-DC converter feedback loop. Attempts to use large filters between the DC-DC converters and the fan motors resulted in unstable operation. The fan motor current transients reflected back to the common DC power source interacted with the DC-DC converters for the electronic circuitry and caused logic circuitry malfunction.

The prior art DC-DC converters operate at frequencies several orders of magnitude higher than the fan current waveform frequency in an attempt to maintain a constant output voltage for the widely varying currents required by the fan motor. Since the output current of the DC-DC converter varies because of the varying fan current, the input current to the DC-DC converter from the common DC power source also varies. This causes electrical noise to appear on the output of the DC power source. Adding a larger capacitor in shunt with the fan motor has little effect since the DC-DC converter provides a constant output voltage. As a result, almost no current flows through the capacitor. Making the capacitor very large may make the DC-DC converter output voltage unstable. The solution to this problem is that the fan motor has a large rotating energy reserve and has no need for the precision voltage regulation, so long as the average energy delivered by the DC-DC converter is sufficient to power the fan motor. A large ripple voltage input is acceptable to the fan motor, but is not acceptable on the output of the DC-DC converter connected to the logic circuits.

It, therefore, can be seen that it is a problem to integrate a cooling fan with electronic circuitry while using a common DC power source to power both the fan motor and the logic circuits.

SOLUTION

The present invention solves the above and other problems by the provision of a low-frequency DC-DC converter for providing power to a fan motor integrated with electronic equipment that requires cooling. The low-frequency DC-DC converter has a high dynamic output impedance and a variable output voltage. No attempt is made to maintain a constant output voltage to the fan motor, which has a constantly varying input current. This is to be contrasted with the prior art DC-DC converters which were of the high-frequency type and which attempted to deliver a constant output voltage to an inductive load, such as a fan motor. Since the fan has a constantly varying input current, this caused problems for the prior art voltage DC-DC converters which were designed to provide a constant voltage.

The low-frequency DC-DC converter embodying the present invention has a high dynamic output impedance that can accommodate varying load currents without feeding back transients to the DC-DC converter serving the logic circuitry. The DC-DC converter embodying the present invention makes no attempt to provide a constant output voltage to the fan motor.

The DC-DC converter embodying the present invention uses a capacitor connected in parallel with the fan motor windings to absorb the transients generated by the fan motor. Since the output voltage applied by the DC-DC converter to the fan motor is not constant, the parallel connected capacitor absorbs the fan motor transients, so that the output of the DC-DC converter is a low amplitude sine wave signal. This low amplitude sine wave signal is fed back through the DC-DC converter serving the fan motor to the common power supply and the DC-DC converter serving the logic circuits. This low amplitude, constantly varying sine wave causes no problem to the DC-DC converter serving the logic circuitry since all DC-DC converters easily accommodate low amplitude sine waves variations on their inputs.

The DC-DC converter of the present invention includes an output voltage controller for controlling the voltage applied to the fan motor. The output voltage controller controls the on and off state of switch contacts. The switch contacts are connected between one side of the winding of the fan motor and one side of the common DC power source. The output voltage controller monitors the operation of the fan motor and controls the duty cycle of the closed state of the switch contacts to apply the correct input voltage to the fan motor. This enables the fan motor to operate at the speed required to perform its cooling function.

The switch contacts are connected to circuitry including an inductor and a capacitor connected in parallel with the fan motor from the junction of the inductor and the capacitor. The resulting voltage is extended to the fan motor and the capacitor C. The fan motor current waveform has high-frequency and high amplitude transients. These transients are absorbed by the parallel connected capacitor C. As a result, the input current to the parallel combination of capacitor C and the fan motor is essentially sinusoidal. A portion of this sinusoidal current is fed back through the DC-DC converter serving the fan motor to the output of the common DC power source as well as to the input of the DC-DC converter serving the logic circuitry. However, this small amplitude fed back current has minimal impact upon the DC-DC converter serving the logic circuitry.

The present invention includes feedback circuitry and a thermal motor controller which receives an input signal regarding the required speed of the fan motor, and applies a signal to a voltage controller so that the required voltage is applied to the fan motor.

In accordance with one embodiment of the invention, an integrator is connected between the fan motor and the input of the output voltage control, to provide an additional input signal that is required to maintain the input voltage to the fan that is of the required amplitude.

It can be seen that the present invention solves the above and other problems of the prior art by providing an input signal of the required amplitude and current to the windings of the fan motor so that the fan motor rotates at the speed required to accomplish the required cooling function.

The present invention further solves the problems of the prior art by isolating the large amplitude voltage transients generated by the fan motor so that they are not fed back through the DC-DC converter serving the fan motor to the common DC power source. This prevents the fan motor transients from adversely affecting the operation of the DC-DC converter serving the logic circuitry.

The present invention solves a number of problems. It has dual utilization of converter elements to convert power and block reflected ripple. It eliminates feedback loop instability. It minimizes the need for analog filtering. It minimizes converter dynamic performance requirements. It minimizes converter radiofrequency radiation. It limits motor starting current impact on other system elements.

DETAILED DESCRIPTION

Figure 1:
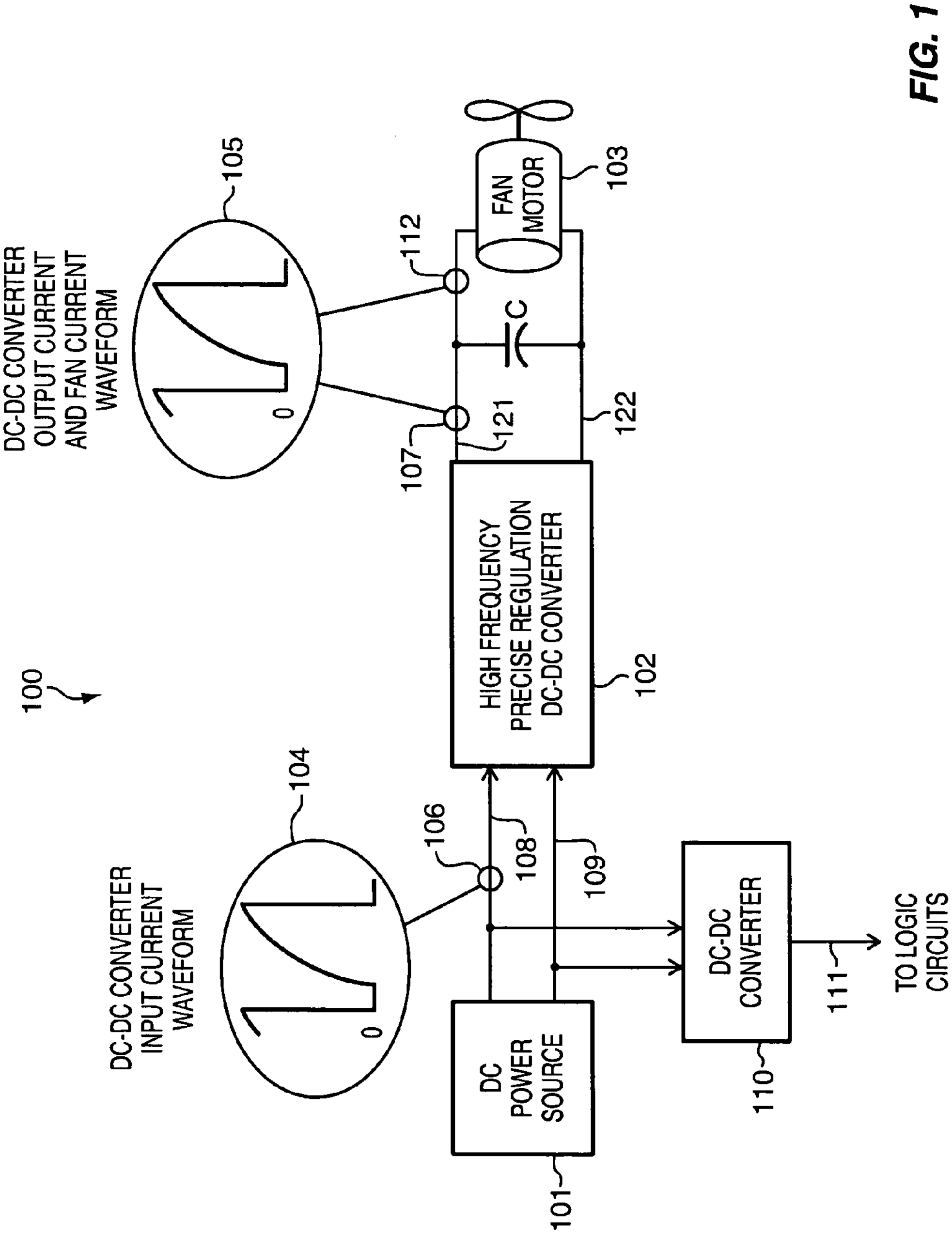
FIG. 1 discloses a prior art system having a fan motor powered by a high-frequency precise regulation DC-DC converter.

Description of FIG. 1

FIG. 1 discloses a prior art system 100 comprising DC power source 101, a first high-frequency precise regulation DC-DC converter 102 and fan motor 103. In operation, DC power source 101 applies a DC potential over conductors 108 and 109 to DC-DC converter 102 serving fan motor 103. FIG. 1 further discloses a second DC-DC converter 110 serving logic circuits 111 (not shown).

DC-DC converter 102 reduces the received input voltage and applies to an output voltage on paths 121 and 122 to fan motor 103. Capacitor C is shunted across fan motor 103 to absorb transients. DC-DC converter 102 attempts to apply a constant DC voltage to its output on paths 121 and 122. However, fan motor 103 draws a varying current and generates ripple currents that are applied to paths 121 and 122. These are shown as waveform 105 at locations 107 and 112 on FIG. 1. Since capacitor C receives the nearly constant output voltage on paths 121 and 122 from DC-DC converter 102, it is ineffective in absorbing the transients 105. As a result, these transients 105 are extended back through DC-DC converter 102 and appear as transients 104 at the juncture of DC power source 101 and conductors 108 and 109 extending to DC-DC converter 110 serving logic circuits 111. These high amplitude transients 104 are of sufficient amplitude to adversely impact the operation of DC-DC converter 110 and its logic circuits 111.

The prior art high frequency precise regulation DC-DC converters, such as element 102, are inadequate for powering fan motors since they have difficulty in tracking the fan motor ripple currents. They further have difficulty in maintaining output voltage variations of less than 1%. Attempts to supply large analog filters, such as capacitors may generate unstable system operation. In addition, the transients generated by the fan motor are reflected back to the common DC power source 101 where they interact with DC-DC converters 110 serving the logic circuitry 111.

DC-DC converter 102 must operate at frequencies several orders of magnitude higher than the fan current frequency in attempting to maintain a constant output voltage over the widely varying current required by fan motor 103. Therefore, the input current to DC-DC converter 102 on paths 108 and 109 has a transient waveform as shown for element 104. This results in electrical noise being propagated to other parts of the system including logic circuitry 111 served by DC power source 101.

Adding capacitor C has very little beneficial effect. Since DC-DC converter 102 is self regulating and has nearly constant output voltage on paths 121 and 122, almost no current flows through capacitor C. Making capacitor C larger is impractical and may make the DC-DC converter 102 output voltage unstable. The fan motor 103 has a huge rotating energy reserve. Also, the fan motor has no need for precision regulation of its input voltage as long as the average energy delivered is sufficient. A large ripple voltage input to fan motor 103 would not be detrimental to its operation.

Figure 2:
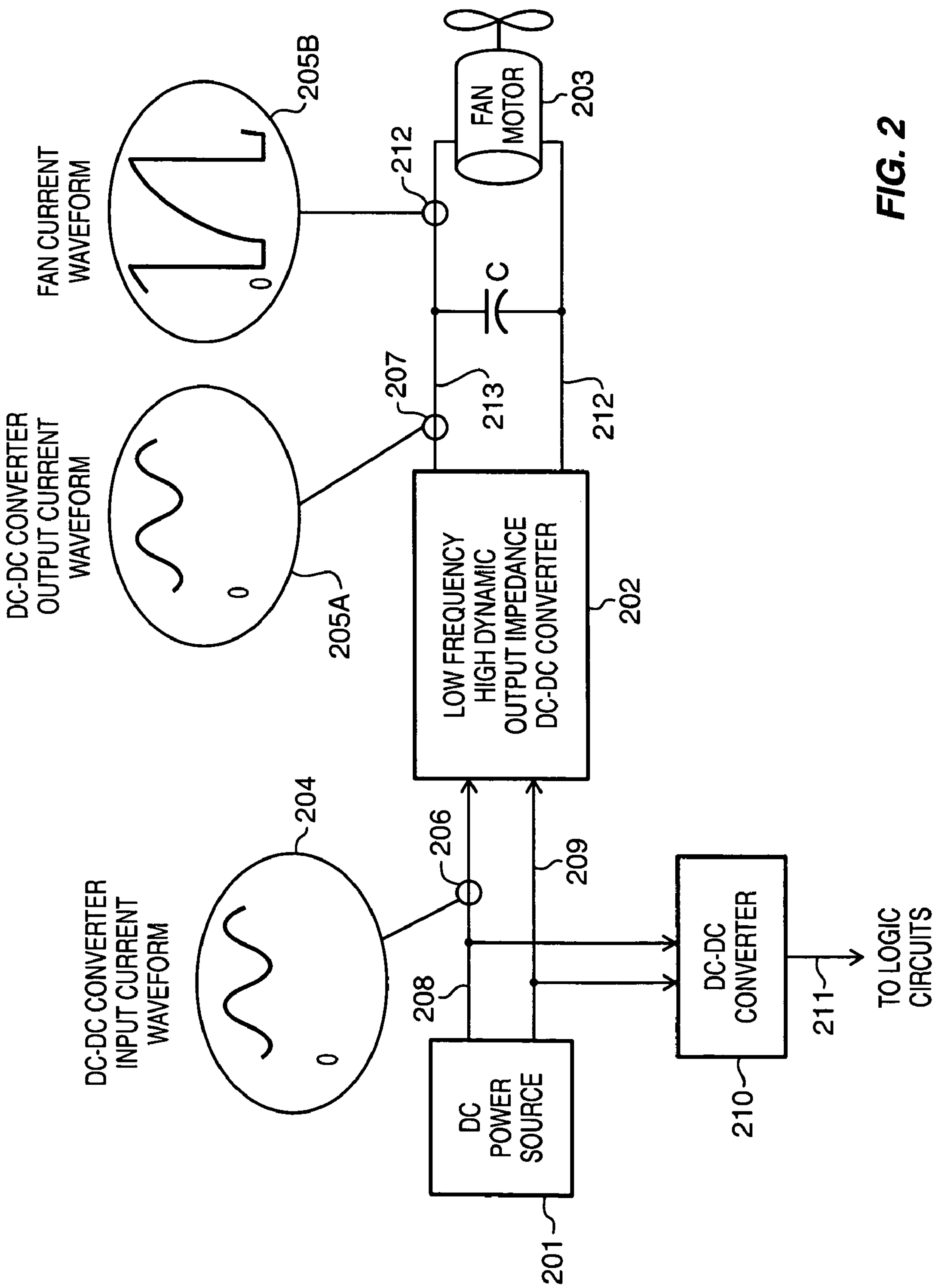
FIG. 2 discloses a low-frequency high dynamic output Impedance DC-DC converter embodying the present invention.

Description of FIG. 2

FIG. 2 discloses one possible embodiment of a system embodying the present invention. The system of FIG. 2 is similar to that of FIG. 1 except that element 202 comprises a low-frequency high dynamic output impedance, DC-DC converter. DC-DC converter 202 differs from DC-DC converter 102 of FIG. 1 in that the DC-DC converter 202 operates at lower frequencies and does not attempt to apply a precision dynamic voltage of constant amplitude to fan motor 203. As a result, most motor ripple current generated by fan motor 203 flows through capacitor C rather than being propagated backwards through DC-DC converter 202 to DC power source 201. Since ripple voltages of 30% or more are acceptable to fan motor 203, capacitor C may have a relatively small value. With most of the ripple current, especially at the highest frequencies, flowing through capacitor C, only a ripple current having a lower frequency and a small amplitude is supplied back through DC-DC converter 202 to common power source 201. The relatively large energy storing elements used in DC-DC converter 202 are effective to further filter the ripple current that would otherwise be reflected back to DC power source 201.

The startup current of fan motor 203 is similarly limited. As a result, the system of FIG. 2 responds more gradually to the fan motor current requirements while minimizing the propagation of steep current transients back to common DC power source 201 and DC-DC converter 210. Element 205B shows the transients absorbed by capacitor C. Element 205A shows the low amplitude sine wave appearing on the output 212 and 213 of DC-DC converter 202. Element 204 shows the low amplitude sine wave appearing on conductors 208 and 209.

Figure 3:
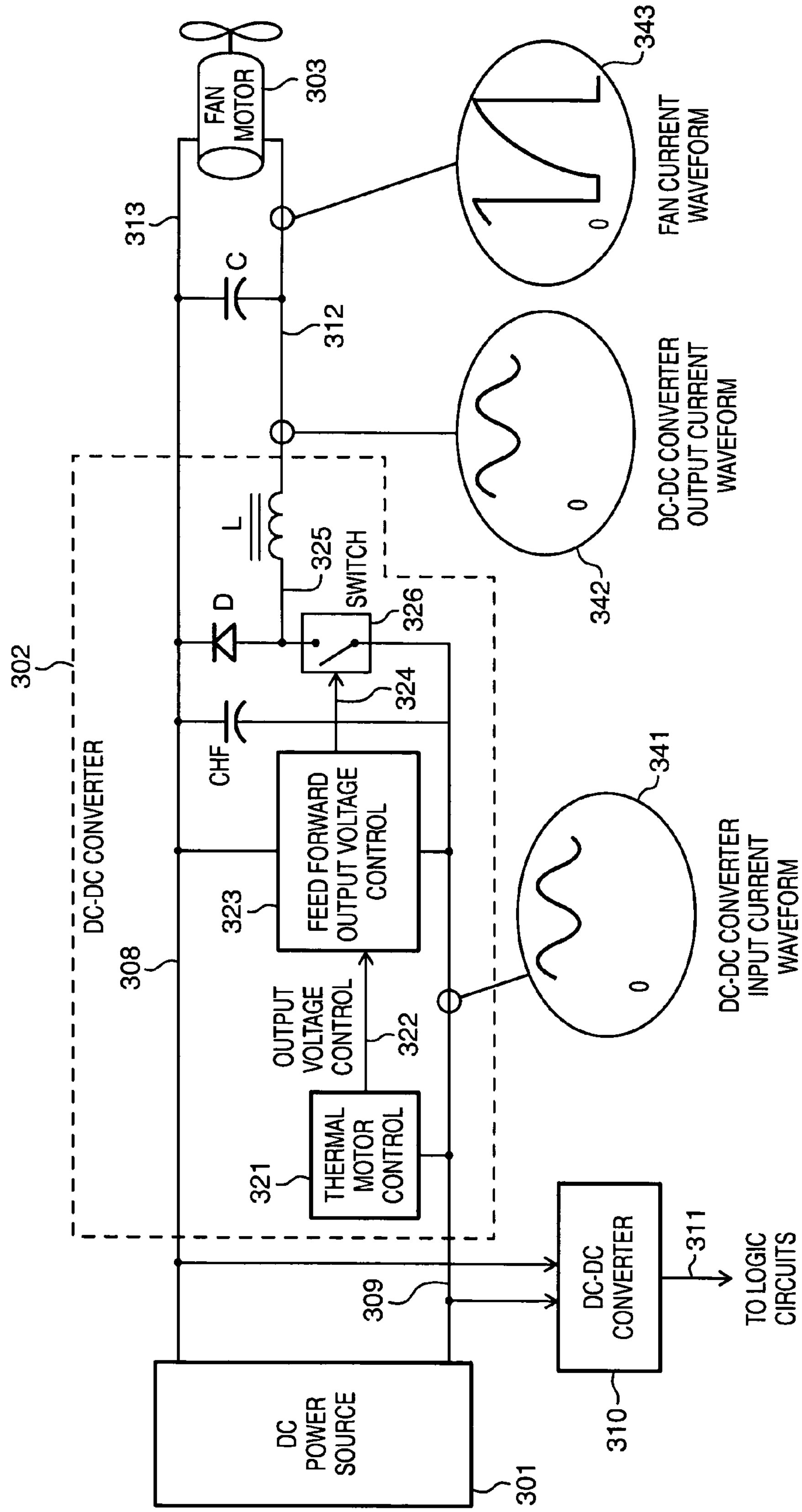
FIG. 3 discloses further details of the embodiment of FIG. 2.

Description of FIG. 3

FIG. 3 discloses further details of DC-DC converter 202 of FIG. 2. FIG. 3 is similar to that of FIG. 2 in that it discloses a DC power source 301 common to both DC-DC converters 310 and 302. FIG. 3 also discloses a fan motor 303 shunted by capacitor C. FIG. 3 discloses further details of DC-DC converter 302. DC-DC converter 302 includes the elements shown within the dashed rectangle 302, which contains feed forward output voltage control element 323. This element 323 controls the amplitude of the voltage applied to fan motor 303 over conductors 313 and 312. DC-DC converter 302 further includes thermal motor control 321 and switch 326.

Thermal motor control 321 determines the required speed of fan motor 303 and applies a signal over path 322 to output voltage control element 323 to control the amplitude of the voltage applied to fan motor 303. In so doing, output voltage control 323 applies an output signal over path 324 to control the duty cycle of the closed state of switch contacts 326. Switch contacts 326 are effective when closed to extend the potential on path 309 from DC power source 301 to the junction of diode D and inductor L on path 325. The open and closed state of these switch contacts 326 is controlled by output voltage that voltage control element 323 applies to path 324. Voltage control element 323 determines the duty cycle of switch contacts 326 by increasing or decreasing the closed time of switch contacts 326. The voltage amplitude to fan motor 303 is increased by increasing the closed time of the contacts. Conversely, the voltage amplitude to fan motor 303 is reduced by reducing the closed time of switch contacts 326.

Current flows continuously through inductor L so that the amplitude of the output voltage applied to fan motor 303 is approximately equal to the input voltage on path 309 from DC power source 301 multiplied by the duty cycle of switch contacts 326. This voltage is achieved by the current through inductor L; this current increases slowly until the output voltage equals the average of the voltage applied to inductor L by switch contacts 326. Whenever contacts 326 are opened, current then flows in the same clockwise direction through inductor L and diode D to fan motor 303. Capacitor C shunts the winding of fan motor 303 to absorb fan motor transients. The high-frequency capacitor CHF filters the current changes through switch contacts 326 which might be 500 times higher than the motor ripple frequency above discussed.

Since there is no need for fast changes in the voltage applied to the windings of fan motor 303, the value of inductor L may be large. This allows inductor L to serve as a filter to fan motor 303 by absorbing the current spikes generated by the fan motor windings. This also allows a lowered operating frequency of DC-DC converter 302. This lowers the radiated interference and raises the power conversion efficiency. Most motor ripple current is forced to flow through capacitor C instead of back through inductor L and DC-DC converter 302 to the other DC-DC converters 310 served by common DC power source 301. A relatively small value of capacitor C is acceptable because the mechanical inertia of the fan motor 303 maintains the required motor speed.

Thermal motor control 321 monitors the thermal state of the equipment to be cooled and determines the amplitude of the required fan motor input voltage required to achieve the desired cooling. The speed of rotation of fan 303 is set by feed forward output voltage control 323 which controls the voltage applied to the fan motor 303. In so doing, feed forward output voltage control 323 receives the output voltage from the DC power source over conductors 308 and 309 and applies a signal over path 324 to set the duty cycle of switch contacts 326. The DC power source 301 and the duty cycle of the switch contacts 326 determine the amplitude of the voltage applied over path 325, through inductor L, and over path 312 to the parallel combination of capacitor C and the fan motor. The required fan motor voltage is achieved without feedback, with no feedback stability problems.

FIG. 3 shows the waveforms existing on the various conductors of the circuitry of FIG. 3. Waveform 343 illustrates the transient currents applied to conductors 312 and 313 by the windings of the fan motor. Most of these transient currents are absorbed by capacitor C and do not appear on these conductors to the left of capacitor C as shown on FIG. 3. Waveform 342 illustrates the low amplitude waveform remaining on conductors 312 and 313 after most of the transients represented by waveform 343 are absorbed by capacitor C. Waveform 342 is a low amplitude sine wave. Waveform 342 is propagated back through DC-DC converter 302 and appears as low amplitude sine wave 341 across the output of DC power source 301. The low amplitude waveform 341 also appears on the input of DC-DC converter 310 and causes no problems for the logic circuits 311.

Figure 4:
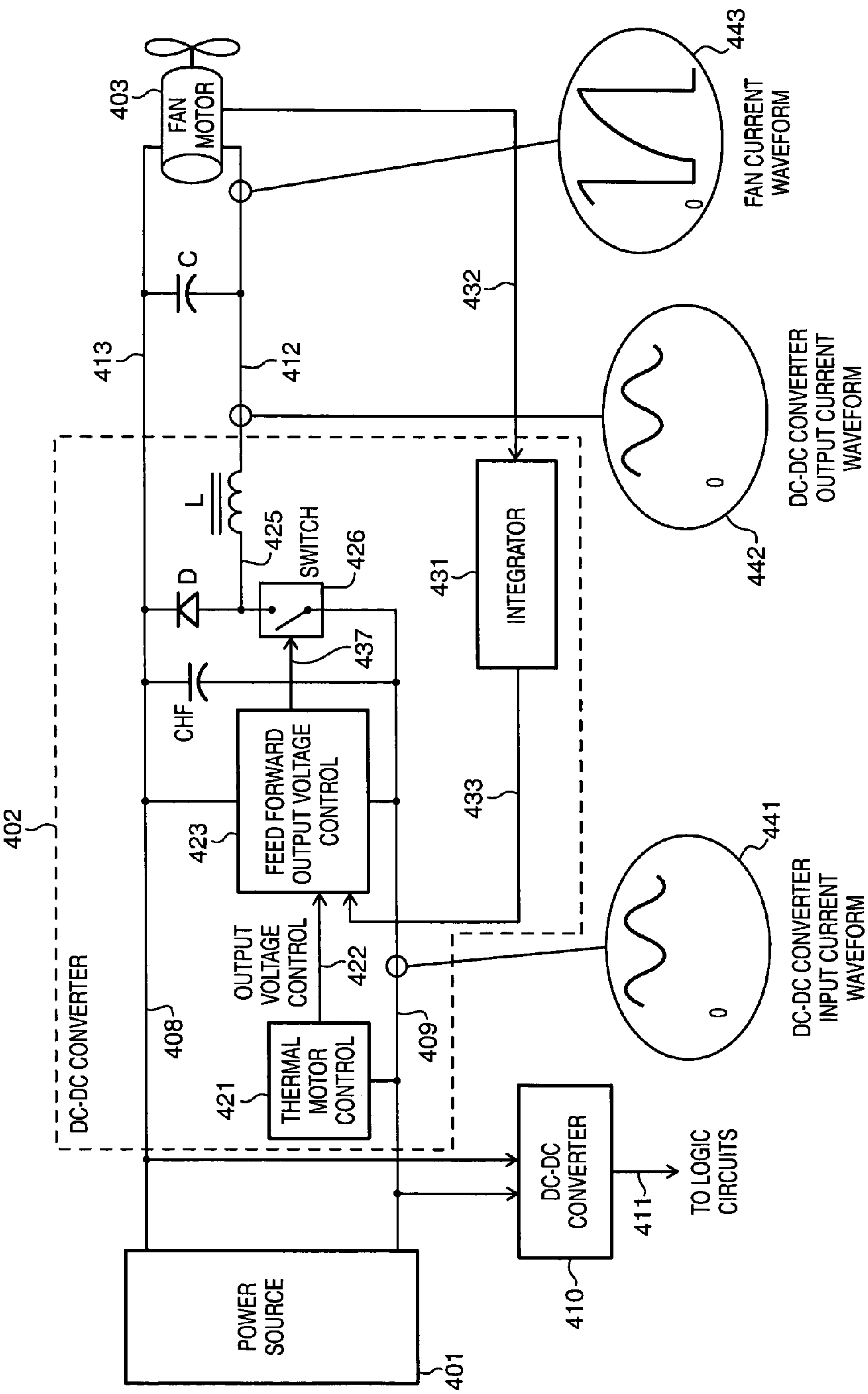
FIG. 4 discloses further an enhancement of the embodiment of FIG. 3.

Description of FIG. 4

The embodiment of FIG. 4 is similar to that of FIG. 3, except that it includes integrator 431 for the improved precision long-term control of the voltage amplitude applied to fan motor 403. The fan motor voltage amplitude is controlled by thermal motor control 421 which adjusts the amplitude of the voltage applied over path 422 to control output voltage control 423. Integrator 431 is relatively slow and does not introduce feedback loop stability problems. While short term speed/control voltage errors may occur, they are small and do not adversely affect the extremely slow dynamic thermal considerations of the fan cooled apparatus. Integrator 431 is connected to provide a fan motor 403 feedback signal to an input of output voltage control 423. Integrator 431 controls the operation of output voltage control 423 to achieve improved operation.

Figure 5:
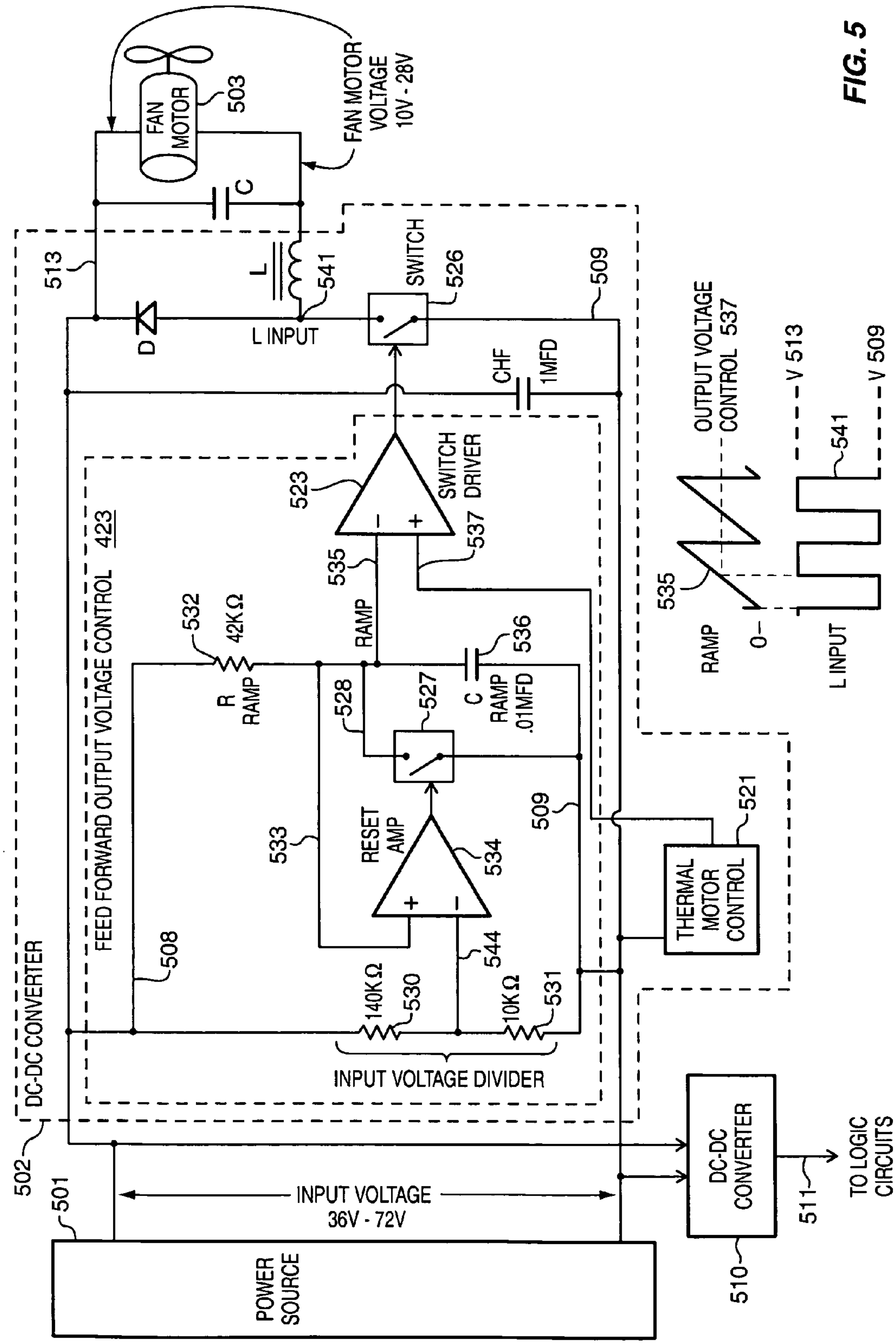
FIG. 5 discloses further details of the embodiment of FIG. 3.

Description of FIG. 5

FIG. 5 is similar to the embodiment of FIG. 3 except that it discloses further details of the feed forward output voltage control element 323 of FIG. 3. The overall DC-DC converter 502 of FIG. 5 comprises the elements within the rectangle 502. The elements outside of rectangle 502, such as power source 501, fan motor 503, and capacitor C correspond to the similarly named elements on the preceding figures. Shown within rectangle 502 is rectangle 423 representing additional details of feed forward output voltage control 323 of FIG. 3.

DC-DC converter 502 permits any voltage of 10 to 28 volts to be applied to fan motor 503 in response to the reception of a voltage from DC power source 501 having a range of 36 to 72 volts, without feedback. DC power source 501 is coupled by conductors 508 and 509 to DC-DC converter 502. DC-DC converter 502 includes a reset amplifier 534, switch contacts 527, and thermal motor control 521 connected by conductor 537 to switch driver 523, to control the duty cycle of switch contacts 526. The duty cycle of the closed state of switch contacts 526 applies voltage to fan motor 503 via diode D and inductor L and shunting capacitor C.

DC-DC converter 502 receives a DC input voltage on paths 508 and 509 from the DC power source 501. The amplitude of the input voltage 501 may range from 36 volts to 72 volts. This input voltage causes current to flow through resistor 532 to charge capacitor 536. An input voltage divider comprising serially connected resistors 530 and 531 provides a voltage to the negative input 544 of reset amplifier 534. This negative input voltage is a small fraction of the input voltage received on path 508 from power source 501. The voltage applied to the input 544 of reset amplifier 534 is 1/15 of the voltage received from DC power source 501 on conductors 508 and 509. When the charging voltage across capacitor 536 reaches an amplitude equal to the input voltage on path 544, reset amplifier 534 closes contacts 527 and short circuits the charge on capacitor 536 through conductor 528. This resets capacitor 536 to zero volts. Reset amplifier 534 then turns off and the above described cycle repeats.

An approximate saw tooth waveform is generated by this charging and discharging of capacitor 536. This saw tooth waveform is applied to over path 535 to the negative input of switch driver 523. The amplitude of this saw tooth waveform is directly proportional to the input voltage received on paths 508–509 from power source 501. Because the saw tooth waveform amplitude on path 535 is a relatively small fraction of the input voltage across conductors 508 and 509, the current that charges capacitor 536 through resistor 532 is essentially linear. If it is desired to obtain more precision of the generated saw tooth waveform, resistor 532 may be replaced with a current generator having an output directly proportional to the input voltage. This it is shown on FIG. 6.

Thermal motor control 521 determines the thermal conditions of the equipment to be cooled and applies an output signal over path 537 to the +input of switch driver 523. This voltage is equal to the desired fan motor voltage multiplied by the ratio of 1/15 in this example. Thus, a 1 volt signal on path 537 represents a desired 15 volts applied to the fan motor 503.

Switch driver 523 compares the saw tooth voltage received on path 535 and closes switch contacts 526 when capacitor 536 is reset. The closure of switch contacts 526 applies the voltage from power source 501 on path 509 to inductor L. This voltage extends to fan motor 503. When the voltage on capacitor 536 exceeds the output voltage control voltage applied to path 537, switch driver 523 opens switch contacts 526 and current then flows clockwise through inductor L, diode D, and the parallel combination of capacitor C and fan motor 503. The duty cycle of switch contacts 526 varies in accordance with the input voltage on path 535 and the output voltage received from thermal motor control 521 on path 537. The variation in duty cycle of switch contacts 526 cancels any variation in the input voltage received from the power source 501 on paths 508 and 509. This provides the desired input voltage to fan motor 503 without the necessity of providing feedback. Reasonable accuracy can be achieved for an input voltage variation of 36 to 72 volts while enabling a desired fan motor voltage of 10 volts to 28 volts to be achieved. In addition the frequency will be nearly constant.

When switch contacts 526 are closed, current flows from DC power source 501, over conductor 508, through the parallel combination of capacitor C and fan motor 503, through inductor L, and through switch contacts 526 over conductor 509 back to the lower side of power supply 501. This current continues to flow as long as contacts 526 are closed. When switch contacts 526 are opened, the inductive effect of inductor L causes a clockwise circulating current to flow in the same direction through the parallel combination of capacitor C and fan motor 503, and through inductor L. This current flows upward through diode D and back to the junction of capacitor C and the winding of fan motor 503. This current decreases in amplitude time wise and continues only so long as switch contacts 526 remain open. The current through diode D ceases when the switch contacts 526 are closed, at which time the current flows as above described through switch contacts 526 back to the lower side of DC power source 501.

The bottom portion of FIG. 5 discloses waveform 535 representing the saw tooth voltage across capacitor 536. Also shown is a rectangular wave voltage 541 which is applied to the left side of inductor L.

Figure 6:
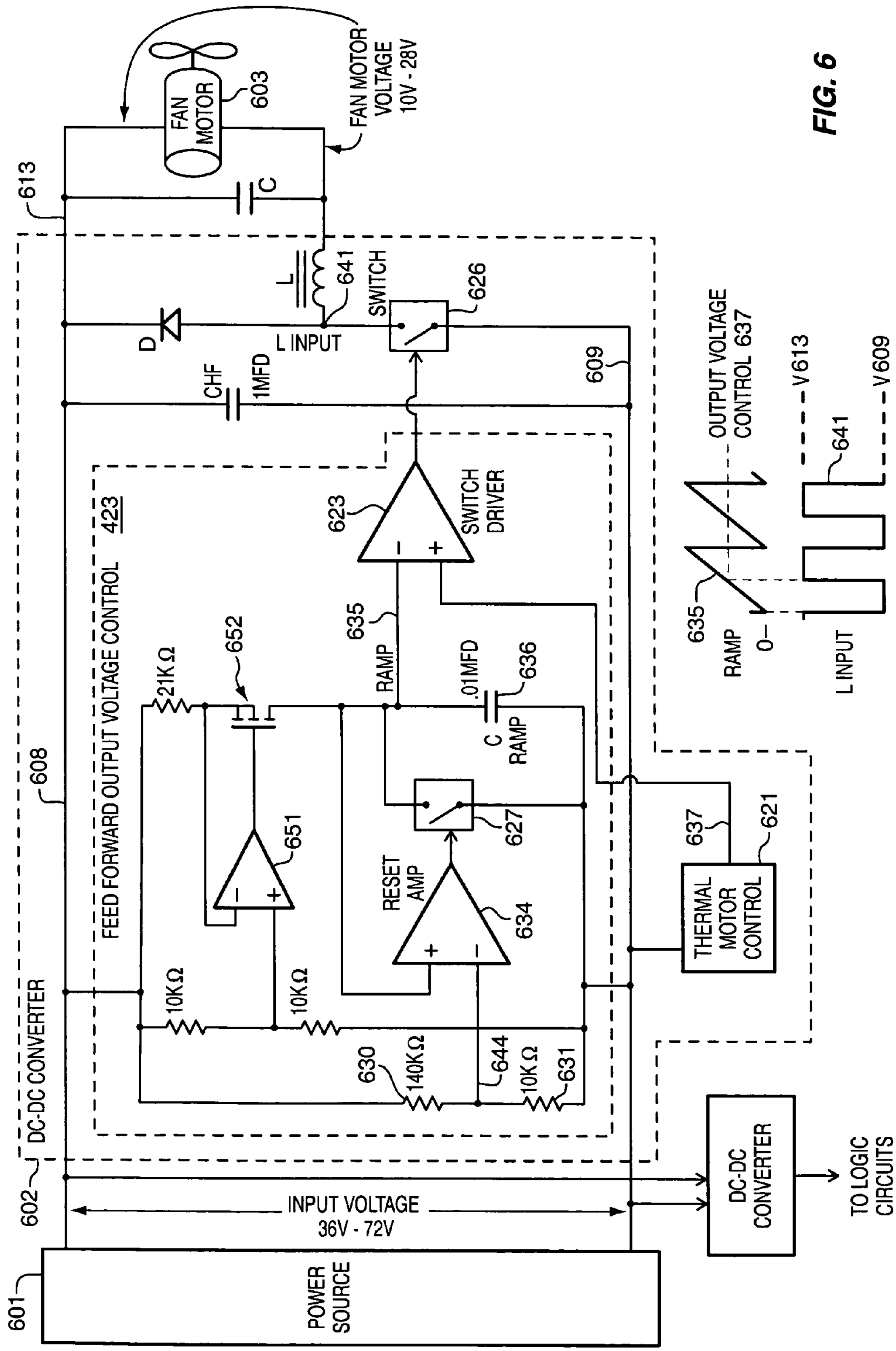
FIG. 6 discloses further details an enhancement of the embodiment of FIG. 5.

Description of FIG. 6

FIG. 6 describes further details of the circuitry of FIG. 5. The circuitry of FIGS. 5 and 6 differ only in that FIG. 6 discloses amplifier 651 coupled to transistor 652 to provide a current generator that enables the saw tooth circuitry capacitor 636 to generate a saw tooth waveform 635 of improved precision.

The above description discloses possible exemplary embodiments of this invention. It is expected that those skilled in the art can and will design alternative embodiments that infringe on this invention as set forth in the claims below literally or through the Doctrine of Equivalents.

Switch contacts 326 may be contacts of a relay, a mechanical switch or a semiconductor switch.

I claim:

1. Apparatus adapted to apply a variable voltage and current to an inductive load; said apparatus comprising:

a first DC-DC converter having a low-frequency high dynamic output impedance and being adapted to apply a variable voltage and current to an output of said first DC-DC converter;

said output of said first DC-DC converter is adapted to be connected to a transient limiter connected in parallel with said inductive load to minimize the amplitude of current transients generated by said inductive load in response to the reception of said variable voltage from said output of said first DC-DC converter; and said first DC-DC converter being effective to inhibit said current transients generated by said inductive load from being extended from said output of said first DC-DC converter and back through said first DC-DC converter to a DC power source connected to an input of said first DC-DC converter.

2. The apparatus of claim 1 wherein said inductive load comprises the windings of a DC motor.

3. The apparatus of claim 1 wherein said inductive load comprises the windings of a fan motor adapted to provide cooling for a system embodying said apparatus.

4. The apparatus of claim 3 wherein said first DC-DC converter is adapted to control the amplitude of said variable voltage applied to said windings of said fan motor.

5. The apparatus of claim 3 further comprising:

a second DC-DC converter;

said output of said DC power source being connected in common to said input of said first DC-DC converter and to an input of said second DC-DC converter; and said transient limiter comprises a first capacitor connected in shunt across said windings of said fan motor.

6. The apparatus of claim 5 further including:

switch contacts in said first DC-DC converter connected between an output of said DC power source and said windings of said fan motor; and a voltage control in said first DC-DC converter effective to control the duty cycle of the closed state of said switch contacts to control the amplitude of the voltage applied to said windings of said fan motor.

7. The apparatus of claim 6 wherein said switch contacts are connected in series with an inductor to a first side of said windings of said fan motor;

said switch contacts are further connected in series with a diode to a second side of said windings of said fan motor; and said first capacitor is connected in series with an inductor across said windings of said fan motor.

8. The apparatus of claim 7 further comprising:

an integrator in said first DC-DC converter connected between said windings of said the fan motor and an input of said voltage control to regulate the amplitude of said voltage applied to said windings of said fan motor.

9. The apparatus of claim 3 wherein said first DC-DC converter further comprises:

switch contacts in said first DC-DC converter connected between said output of said DC power source and said windings of said fan motor;

a voltage control that controls the duty cycle of the closed state of said switch contacts;

means including a thermal motor control that applies signals to an input of said voltage control to control the duty cycle of the closed state of said switch contacts; and the closed state of said switch contacts controls the amplitude of said voltage applied to said windings of said fan motor to operate said fan motor at the speed required to perform said cooling.

10. The apparatus of claim 9 further including saw tooth waveform generating means;

said voltage control is responsive to said receipt of a signal defining the thermal state of said system as well as the receipt of a saw tooth waveform on its input to control the duty cycle of the closed state of said switch contacts.

11. The apparatus of claim 10 which said saw tooth waveform generating means comprises:

a second capacitor;

circuitry including a resistor for applying charging current to said second capacitor;

said circuitry further comprises a second pair of switch contacts that charge said second capacitor when said second switch contacts are open and short-circuit said second capacitor when said second switch contacts are closed; and said charging of said second capacitor through said resistor when said second contacts are open is effective to define said saw tooth waveform.

12. The apparatus of claim 11 wherein said first mentioned switch contacts are connected via an inductor to one side of the windings of said fan motor;

said first capacitor is connected in parallel with the windings of said fan motor;

said inductor further is connected in series with a diode across the windings of said fan motor;

said inductor and said diode are effective to maintain current through said fan motor when said switch contacts are open; and said first capacitor absorbs transients generated by said fan motor.

13. The apparatus of claim 9 comprising part of a system that is cooled by said fan motor;

said apparatus including said first DC-DC converter that receives power from said DC power source and applies voltage of the required amplitude to the windings of said the fan motor to rotate said fan motor at the speed required to provide the required cooling to said system.

14. The apparatus of claim of 13 wherein said first DC-DC converter is effective to inhibit transients generated by said fan motor from being extended back through said first DC-DC converter to said DC power source;

said DC power source is connected in common to the input of said second DC-DC converter so that said second DC-DC converter is isolated from transients that could adversely affect the operation of circuitry coupled to the output of said second DC-DC converter.

15. A method of operating a system in which a DC power source is adapted to apply power to logic circuits as well as to windings of a motor of a fan that provides cooling for said system:

said method comprising the steps of;

extending power from said power source through a first DC-DC converter to an inductive load comprising said windings of said fan motor;

operating said first DC-DC converter to apply a current and as well as a voltage of a controlled amplitude to said windings to operate said fan motor to provide said cooling;

extending power from said DC power source through a second DC-DC converter to apply voltages and currents to said logic circuits of said system; and operating said first DC-DC controller to prevent transients generated by the operation of said fan motor from being extended back through said first DC-DC converter to said DC power source and said input of said second converter.

16. The method of claim 15 including the further steps of:

shunting the windings of said fan motor with a first capacitor;

said first capacitor being effective to inhibit current transients generated by said fan motor; and connecting an inductor in series with a diode across said windings to further inhibit the generation of current transients by said fan motor.

17. The method of claim 16 including the further steps of:

connecting the junction of said inductor and said diode in series with a pair of switch contacts to said DC power source;

controlling the duty cycle of the closed state of said switch contacts to control the amplitude of the voltage extended from said DC power source to the windings of said fan motor; and said voltage being effective for controlling the speed of rotation of said fan motor to provide the required cooling.

18. The method of claim 16 including the further steps of:

operating circuitry including a switch driver and a thermal motor control that monitors the thermal state of said system to control the duty cycle of the closed state of said switch contacts; and said duty cycle being effective for controlling the application of a voltage to the windings of said fan motor having the amplitude required to enable said fan motor to operate at the speed required to provide the required cooling to said system.

19. The method of claim 18 including the further steps of:

operating said thermal motor control to apply to a switch driver a control voltage representing the thermal state of said system;

operating a voltage divider connected to a second capacitor for generating a saw tooth waveform across said second capacitor;

extending said saw tooth waveform to a second input of said switch driver; and operating said switch driver under the joint control of said saw tooth waveform and the output of said thermal motor control to operate said switch driver to define the duty cycle of said switch contacts.

20. The method of claim 19 including the further steps of operating a transistor connected to said second capacitor to provide a saw tooth waveform of improved precision; and applying said saw tooth waveform of said improved precision to said switch driver for the control of said switch contacts.

* * * * *